3,231,525
PROCESS FOR PREPARING UREA-FORMALDE-
HYDE FOAMS AND REDUCING THE FORMAL-
DEHYDE ODOR FROM SAID FOAM
Fred L. Kelly and Rodney L. Wells, Chester, Va., assignors to Allied Chemical Corporation, New York, N.Y., a corporation of New York
No Drawing. Filed Aug. 21, 1962, Ser. No. 218,432
6 Claims. (Cl. 260—2.5)

This invention relates to urea-formaldehyde resin foams, and more particularly to such foams in which the formaldehyde odor is substantially suppressed or eliminated, and to a process for preparing such odor-free foams.

Urea-formaldehyde foams have been prepared in the past and are useful when solidified as acoustical and insulating compositions.

In general such urea-formaldehyde foams may be prepared by separately producing (1) a partially resinified aqueous urea-formaldehyde solution, (2) a liquid acidic foam, as by atomizing a gas such as air into an aqueous acidic hardener solution composed of water, a foaming agent, and an acidic material hardening agent for the resin. Thereafter, the resin solution and foamed hardener are mixed as in a foam gun. The resulting resinous foam is then cured, i.e. allowed to harden or solidify.

In spite of the excellent insulating properties of such hardened urea-formaldehyde foams, their use has been considerably limited because of the strong formaldehyde odor which not only accompanies preparation of the resinified foam but which tends to persist in the finished insulation over considerable periods of time. As is well known, the odor of formaldehyde is extremely pungent and is irritating to the eyes and respiratory systems of those who come in contact with it.

It has been observed that formaldehyde odor in the urea-formaldehyde foams is due to the presence not only of free formaldehyde in the system but also to the presence of formaldehyde which is combined in the form of N-methylol groups. Substantial reduction in the initial formaldehyde odor which accompanies preparation of the resinified foam has been achieved in the past through the addition to the partially reinified aqueous urea-formaldehyde resin solution of a small proportion of ammonium bicarbonate or ammonium carbonate prior to mixing the resinous solution with the foamed hardener solution as described in copending application of Ged H. Justice Serial No. 157,255, filed December 5, 1961. Such addition, while of great value in alleviating formaldehyde irritation to personnel during preparation and application of the foams, has not been completely effective in eliminating the persistence or recurrence of formaldehyde odor in the finished insulation, so that houses or other structures containing such insulation are often plagued with the unpleasant odor over long periods of time. Some alleviation of the persistence of the odor has been achieved by including other additives such as terpenes with the ammonium carbonate or bicarbonate added to the resin solution, but complete elimination, and non-recurrence of odor has not heretofore been successfully accomplished.

An object of the present invention is to provide a urea-formaldehyde foam wherein initial formaldehyde odor is controlled or eliminated and recurrence of objectionable formaldehyde odor after hardening and storage for substantial periods is prevented.

These and other objects are accomplished according to our invention wherein a small proportion of urea is added to the aqueous acidic hardener solution prior to foaming and mixing the acidic foam with the resin solution. The resulting finished foams are virtually devoid of objectionable formaldehyde odor, and this freedom from odor persists in the finished foam.

We are aware that in the preparation of urea-formaldehyde foams, free urea is sometimes added to the partially resinified urea-formaldehyde resin solution before it is mixed with hardener solution, in order to improve the compressive strength of the resulting foams. Such addition, however, does not serve to suppress formaldehyde odor, and only by adding urea to the hardener solution (rather than the resin solution) is this surprising result obtained.

While the reason for this surprising result is not entirely clear, it is believed that the addition of urea to the acidic hardener solution facilitates rapid formation of relatively stable methylene compounds in the foam by reaction with the formaldehyde and methylol compounds in the resin as illustrated in the following equations:

(1)

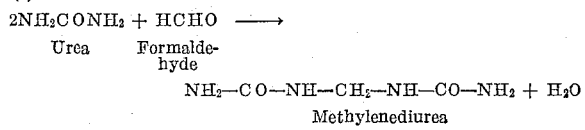

Methylenediurea (2)

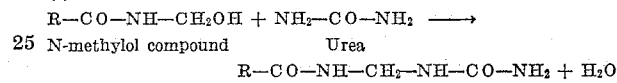

R—CO—NH—CH$_2$—NH—CO—NH$_2$ + H$_2$O

Methylene compound in foam where R=remainder of molecule.

Thus it is possible that when added to hardener, and the hardener then mixed with the resin, the added urea reacts with both the free formaldehyde and the N-methylol compounds to produce non-odorous compounds, whereas when urea is added to the resin solution it reacts to form additional methylol compounds which are themselves odorous.

In carrying out the process according to our invention, we may prepare and mix aqueous urea-formaldehyde resin solution and foamed hardener by any conventional means so long as excess urea is present in the acidic hardener solution in the required proportions, prior to mixing the components.

In general, at least about 0.5 mol of urea, preferably between about 1 and about 2 mols of urea is added to the hardener solution for each mol of formaldehyde combined as N-methylol groups in the resin solution and preferably the same proportion for each mol of free formaldehyde also. In general between about 2 parts and about 14 parts per 100 parts of hardener solution will be used.

The formaldehyde in the resin which is free and that which is combined as N-methylol groups is easily determined by a modification of the standard sulfite method as described, for example in "Formaldehyde," by J. F. Walker, second edition, page 383, Reinhold Publishing Corp., New York, N.Y. The aqueous sodium sulfite reacts with free formaldehyde rapidly at 0° C. and it reacts further in a similar way at 80° C. with formaldehyde which is combined in the form of N-methylol groups. Alternatively, the free formaldehyde may be determined by the hydroxylamine hydrochloride method and total formaldehyde by the iodimetric method, see G. Smets and A. Borzee, J. Polymer Sci. 8, 371–94 (1952).

For preparation of the resin solution, we prefer to utilize urea-formaldehyde solutions in which the formaldehyde component and part of the urea are supplied in the form of a stabilized solution of urea-formaldehyde reaction products prepared according to the teachings of U.S. Patent 2,652,377, issued September 15, 1953, and commercially available under the trade name "U.F. Concentrate–85." "U.F. Concentrate–85" is a clear, colorless, viscous, stabilized solution of formaldehyde and urea reaction products in a small amount of water. It contains about 15% water and approximately 85% solids, the latter combined in a formaldehyde to urea mol ratio of about 4.6 to 1. It is believed to be a mixture of polymethylol ureas in solution. To this solution, sufficient urea is added to produce the desired solids content and formaldehyde to urea mol ratios useful in resin solutions adapted for the preparation of foams.

The urea-formaldehyde resin solutions used in preparing foams according to the present process have a solids content of about 50-65%, a formaldehyde to urea mol ratio between about 1.5 and about 2.0 and a viscosity of approximately 20-55 centipoises at 25° C. Suitable resin solutions for use in the process may be prepared as illustrated in the examples herein. Such resins contain about 4-5% of formaldehyde combined as N-methylol groups and up to about 5% of free formaldehyde, usually between about 1% and about 5% of free formaldehyde, and a combined content of odor-forming formaldehyde bodies (free and combined) of between about 5% and about 10%, all percentages being by weight based on the weight of the resin solution. To decrease free formaldehyde in the resin, we preferably add to the partially cured resin solution from about 0.8 to about 8 parts by weight per 100 parts resin solids of ammonium bicarbonate or ammonium carbonate, as described in U.S. application No. 157,255, filed December 5, 1961. If desired, a small proportion of ethylene glycol may be included in the resin as a resin stabilizer.

Our preferred urea-formaldehyde resin solutions have a formaldehyde to urea mol ratio between about 1.8 and about 2.0. Such resins are more stable in storage than resins prepared at lower mol ratios. Heretofore, resins prepared at the higher mol ratios were considered more troublesome due to increased odor of formaldehyde during foam formation and storage; however, the present invention has eliminated this difficulty and the more stable resins may be used without odor problems.

The hardener solution to be foamed is preferably prepared by adding about 2% of a foaming agent such as "Nacconol SZA," an alkyl benzene sulfonic acid composition, or other conventional foaming agent to a 0.05 to 0.5 N acid solution. The aqueous acid solution may be of any strong acid such as, for example, sulfuric acid, hydrochloric acid, formic acid, etc. At least about 0.5 mol of urea, preferably between about 1 mol and about 2 mols of urea, is added to the hardener solution for each mol of free formaldehyde and each mol of formaldehyde combined as N-methylol groups in the resin to be mixed with the foamed hardener solution. Thus, suitable hardener solutions will preferably contain between about 4% and about 10% by weight of urea based on the weight of the hardener solution. The hardener solution thus prepared is then foamed in any desired manner known to produce a foam, as by mixing with air.

The hardener solution containing urea is surprisingly stable. No urea decomposition is noted after several weeks' storage at room temperature and very little urea decomposition occurs after several weeks' storage at 50° C. Thus, there is no problem involved in storage, or shipment of the solution at ordinary temperatures. We have found that the weight ratio of hardener solution to resin solution may be varied between about 0.5 and about 2.3; however, we prefer to operate at a ratio of between about 1.5 and about 2.0. The foamed hardener solution and the partially cured resin solution are mixed in any desired manner to produce diffusion of the resin solution into the liquid phase of the foam without breaking the foam, as by use of a conventional foam gun. The resinous foam is then allowed to harden by reaction of the acid in the hardener solution with the resin solids as is well understood in the art. Hardening is accomplished simply by storage for short times at ambient temperature or if desired by the application of heat.

The resulting foams are substantially free of formaldehyde odor so that installation of the foam may be made without annoyance to workmen from formaldehyde odor. If ammonium carbonate or bicarbonate is used alone as additive to the resin solution, odor tends to recur if the foam is stored for substantial periods, for example, of a week or more. Addition of urea to the hardener solution, however, appears to prevent such odor indefinitely.

The strength of the formaldehyde odor in uncured and cured foam may be correlated with the free formaldehyde present in the foam, so that occurrence of formaldehyde is a measure of the strength of the odor in the foam. Table 1 below compares the respective odors, in terms of free formaldehyde of foam made in accordance with the preferred procedure of the present invention with foams to which only ammonium bicarbonate was added.

TABLE 1.—FREE FORMALDEHYDE IN FOAM DURING STORAGE

| UF Foam | Days Stored | Free Formaldehyde, percent |
|---|---|---|
| Additive: 0.8% NH$_4$HCO$_3$ added to UF resin | 0 | 0.28 |
|  | 1 | 1.00 |
|  | 3 | 0.80 |
|  | 13 | 0.14 |
| Additive: 0.8% NH$_4$HCO$_3$ added to UF resin and 8% urea to hardener solution. | 0 | 0.00 |
|  | 1 | 0.00 |
|  | 3 | 0.00 |
|  | 13 | 0.00 |
| No additive | 0 | 1.47 |
|  | 1 | 1.30 |

It will be noted from Table 1 that while the addition of ammonium bicarbonate alone reduced the free formaldehyde immediately after foaming, the presence of formaldehyde reasserted itself. On the other hand, use of urea in the hardener solution and ammonium bicarbonate in the resin solution not only immediately reduced the free formaldehyde to 0% but the foam on storage remained at 0% formaldehyde.

The following specific examples further illustrate the invention. Parts are by weight except as otherwise noted.

EXAMPLE 1

A resin stock solution was prepared by heating a mixture of 100 parts "U.F. Concentrate-85" (equivalent to 15 parts water, about 60 parts formaldehyde and about 25 parts urea), 35 parts urea 2.5 parts ethylene glycol and 90 parts water for 30 minutes at about 95° C. The pH during this period was about 8. The pH was then adjusted to 4.3 with 4 N formic acid. The solution was heated for an additional 8 minutes at 96-103° C., then was neutralized with 4 N sodium hydroxide to pH 7.4 and cooled to room temperature (25° C.). Viscosity of the resin solution was 24.5 centipoises. Two parts of ammonium bicarbonate was added to the resin and pH was adjusted to 7.0 with 4 N sodium hydroxide. The resulting stock solution was stable for at least six weeks. It analyzed 2.5% free formaldehyde and 3.9% formaldehyde combined as N-methylol groups. Thus 100 parts of this solution contained 6.4 parts or 0.21 mol of free formaldehyde plus formaldehyde combined as N-methylol groups.

A hardener stock solution was prepared by adding 16 parts (0.26 mol) of urea and 4 parts Nacconol SZA, an alkyl benzene sulfonic acid composition, to 180 parts of 0.1 N H$_2$SO$_4$.

Two hundred parts of hardener stock solution was foamed by mixing it with air in a mixing chamber, and 100 parts of resin stock solution was then mixed with the foam. Thus, the mol ratio of urea in the hardener solution to free formaldehyde and formaldehyde combined as N-methylol groups in the resin was 1.2.

The resulting urea-formaldehyde foam had no formaldehyde odor. The foam was placed in molds at room temperature where it hardened within a few minutes. Samples of the foam were analyzed for formaldehyde content at several time intervals after placing in the mold, with the following results:

| Time Interval | Percent Free Formaldehyde | Percent Formaldehyde Combined as N-Methylol Groups |
|---|---|---|
| 4 Hrs | 0.0 | 0.0 |
| 1 Day | 0.0 | 0.0 |
| 4 Days | 0.0 | 0.0 |

The foam had no unpleasant formaldehyde odor at any time during a two-weeks period after the foam was prepared; observations were stopped at the end of this time.

Substitution of 12 parts of urea for the 16 parts of urea added to the hardener solution in the above mixture resulted in a foam which was similar to the first foam in having no unpleasant formaldehyde odor.

EXAMPLE 2

*Comparative examples of urea-formaldehyde foam preparation with urea added to hardener solution and with urea added to resin*

(2.1) A urea-formaldehyde resin solution was prepared as follows: To a solution of 175 g. urea and 12.5 g. ethylene glycol in 450 g. water was added, at 25° C., 500 g. U.F. Concentrate-85 containing 60% formaldehyde and 25% urea. The resulting solution, at pH approximately 8.0, was rapidly heated to gentle reflux at 100° C. and maintained at that temperature, with stirring, for 30 minutes. The pH was adjusted to 4.5 by the addition of 1.8 ml. 4 N formic acid, and refluxing was continued at 101–103° C. for 13 minutes. The pH was then raised to 8.3 by the addition of 1.25 ml. 4 N aqueous sodium hydroxide, and the solution rapidly cooled by immersing the flask in ice water. When the temperature had reached 40° C., 10.0 g. ammonium bicarbonate was slowly added. The solution was cooled to 25° C. and brought to pH 7.0 by the addition of 6.1 ml. 4 N sodium hydroxide. The resulting resin was initially clear and colorless, but became slightly turbid within a few hours. The pH remained at 7.0 after one week. Viscosity (Brookfield, 25° C.) was 27.5 centipoises initially, and 29.5 centipoises after one week. Formaldehyde assays by bisulfite method at 0° C. and 80° C. showed about 2.5% free formaldehyde and about 3.9% N-methylol formaldehyde, respectively.

Formaldehyde odor is noticeable in the foams at all free formaldehyde concentrations above about 0.1%. Methylol concentrations as high as about 1% can be tolerated without objectionable odor.

A foam was prepared from the above resin as follows: In a Mixmaster bowl was placed 150 ml. of a hardener solution containing 3 g. (2%) Nacconol SZA and 12 g. (8%) urea in 0.1 N $H_2SO_4$. Rapid beating with the Mixmaster was started, 75 ml. of the resin added, and beating continued for about a minute until the resulting foam became stiff. Assays by 0° C. bisulfite method showed 0% free formaldehyde after 1 hour and 0% after 1 day, indicating that both initial odor and odor recurrence had been completely eliminated.

(2.2) A second foam was prepared in a similar manner with no urea in the hardener solution but with 3 g. urea dissolved in the 75 ml. of resin immediately before foaming. Assays by 0° C. bisulfite method showed 0.7% free formaldehyde after 1 hour, and 1.3% after 1 day, indicating that while initial odor had been substantially reduced, recurrence of odor had not been eliminated.

(2.3) A third foam was prepared in a similar manner, but with 6 g. urea in the resin and none in the hardener. Assays showed 0.3% free formaldehyde after 1 hour and 1.0% after 1 day. This test showed that even larger proportions of urea in the resin solution failed to eliminate the recurrence of objectionable odor.

(2.4) A fourth foam was prepared with 12 g. urea in the resin and none in the hardener. Assays showed 0.1% free folmaldehyde after 1 hour and 0.4% after 1 day, indicating that even the use of very large proportions of urea in the resin solution failed to eliminate recurring objectionable formaldehyde odor.

EXAMPLE 3

Two foamed resins were prepared, in one of which 8% urea was added to the hardener solution before foaming and mixing with the resin solution. In the other, no urea was added to the hardener solution. The resin solution in each case was a mixture of

| | Parts |
|---|---|
| U.F. Concentrate-85 | 1400 |
| Urea | 495 |
| Water | 1260 |
| Melamine | 17.6 |

(3.1) The above materials were mixed and heated to 95° C., then held at 95° C. for 30 minutes. The pH was then adjusted to 4.5 with 4 N formic acid, and heating was continued for 7 minutes. The pH was then adjusted to 8.0 with 4 N sodium hydroxide. The resin was then cooled to 25° C. yielding a clear resin with viscosity 28 centipoises and containing 2.3% free formaldehyde.

(3.2) A hardener solution was prepared of water containing sufficient sulfuric acid to produce a 0.1 normal solution to which 2% of "Nacconol SZA" was added.

(3.3) A second hardener solution was prepared identical to the first except that it contained in addition 8% of urea.

Resinous foams were prepared by areating 60 parts of each hardener solution and gradually adding to each 30 parts of the resin solution.

The respective resinous foams were then analyzed for free formaldehyde plus methylol bound formaldehyde by titration of portions thereof at 80° C. by the sodium sulfite method at intervals of foam age ranging from 1 hour to 3 days with the results shown below.

FORMALDEHYDE IN FOAMS WITH AND WITHOUT UREA

| Time Interval | Percent by Weight Total Formaldehyde [1] | |
|---|---|---|
| | No Urea in Hardener | 8% Urea in Hardener |
| 1 hour | 13.6 | 2.3 |
| 1 day | 9.5 | 1.8 |
| 2 days | 9.4 | 0.7 |
| 3 days | 8.2 | 0.5 |

[1] Dry basis, equal to about 6 times amount as calculated on wet basis.

It will be noted that even without the presence of an odor control agent such as ammonium bicarbonate in the resin solution, use of 8% urea in the hardener solution, virtually eliminates the persistence of formaldehyde after periods of a few days.

While the above describes the preferred embodiments of the invention, it will be understood that departures may be made therefrom within the scope of the specification and claims.

We claim:

1. In a process for preparing a solid urea-formaldehyde foam by mixing a partially resinified aqueous urea-formaldehyde resin solution with an aqueous acidic foam prepared by foaming an acidic hardener solution of a surfactant, the step which comprises adding to said acidic hardener solution prior to mixing with said resin solution at least 4% by weight, based on the acidic hardener solution, of urea to substantially eliminate formaldehyde odor in the solid-urea-formaldehyde foam.

2. The process according to claim 1 wherein the quantity of urea added to the hardener solution is at least about 0.5 mol for each mol of formaldehyde combined as N-methylol groups.

3. The process according to claim 1 wherein the quantity of urea added to the hardener solution is at least about 0.5 mol for each mol of free formaldehyde and for each mol of formaldehyde combined as N-methylol groups.

4. A process for preparing odorless solid urea-formaldehyde foams from aqueous urea-formaldehyde resin solutions containing between about 5% and about 10% by weight of odorous formaldehyde bodies, selected from the group consisting of (1) free formaldehyde and (2) combined formaldehyde in the form of N-methylol groups, which comprises mixing said aqueous urea-formaldehyde resin solution with an aqueous acidic foam from an aqueous acid solution containing a surfactant as a foaming agent, and at least 4% by weight, based on the acidic foam, of urea, said mixing being in the weight ratio between about 0.5 and about 2.3 parts by weight of said acidic foam per part of resin solution, and permitting the resultant resinous foam to harden.

5. A process for substantially eliminating odorous formaldehyde bodies from a foamed urea-formaldehyde resinous composition which comprises (1) preparing a urea-formaldehyde resin solution having a solids content of between about 50% and about 65%, a mol ratio of formaldehyde to urea between about 1.5 and about 2.0 and between about 5% and about 10% by weight of odorous formaldehyde bodies selected from the group consisting of free formaldehyde and combined formaldehyde as N-methylol groups, (2) preparing a foamed acidic hardener solution comprising an aqueous acidic solution of a surfactant, containing between about 4% and about 10% by weight of urea, (3) mixing said resin solution and said foamed, urea-containing acidic hardener solution in proportions in a weight ratio of between about 0.5 and about 2.3 parts of said acidic hardener per part of resin solution and permitting the resulting mixture to harden whereby an odorless hardened foam results.

6. A foamable composition resinifiable with a urea-formaldehyde resin, essentially consisting of a surface-active foaming agent, an aqueous acid solution as hardener, and at least 4% by weight, based on the composition, of urea for suppressing formaldehyde odors in urea-formaldehyde resin foams prepared with the foamable composition.

References Cited by the Examiner
UNITED STATES PATENTS 2,559,891   7/1951   Meyer _____ 260—2.5
2,813,780   11/1957  Vieli _____ 260—2.5

FOREIGN PATENTS 230,162   9/1960   Australia.
470,900   8/1957   Canada.
545,538   8/1957   Canada.

MURRAY TILLMAN, *Primary Examiner.*
LEON BERCOVITZ, *Examiner.*